(12) United States Patent
Ruparelia et al.

(10) Patent No.: US 10,984,419 B2
(45) Date of Patent: Apr. 20, 2021

(54) METHOD AND SYSTEM FOR PERFORMING SECURE BANKING TRANSACTIONS

(71) Applicant: Tata Consultancy Services Limited, Mumbai (IN)

(72) Inventors: Hitesh Umedkumar Ruparelia, Ahmedabad (IN); Ramya R. Varma, Bangalore (IN); Guruprasad MS, Bangalore (IN); Basavaraj Murugendraiah, Bangalore (IN); Jaipal Gopalan, Bangalore (IN); Sathish Vallat, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 712 days.

(21) Appl. No.: 15/010,854

(22) Filed: Jan. 29, 2016

(65) Prior Publication Data

US 2016/0364729 A1 Dec. 15, 2016

(30) Foreign Application Priority Data

Jun. 15, 2015 (IN) .......................... 2295/MUM/2015

(51) Int. Cl.
*G06Q 20/40* (2012.01)
*G06Q 20/32* (2012.01)
(Continued)

(52) U.S. Cl.
CPC ... *G06Q 20/40145* (2013.01); *G06Q 20/1085* (2013.01); *G06Q 20/327* (2013.01);
(Continued)

(58) Field of Classification Search
CPC .... G06Q 20/1085; G06Q 40/02; G06Q 20/40; G06Q 20/18; G06Q 20/3223; G06Q 20/32; G06Q 20/108; G06Q 20/40145
(Continued)

(56) References Cited

U.S. PATENT DOCUMENTS

| | | | |
|---|---|---|---|
| 6,286,756 B1 | 9/2001 | Stinson et al. | |
| 2009/0083843 A1* | 3/2009 | Wilkinson, Jr. | ...... H04L 9/3234 726/9 |

(Continued)

FOREIGN PATENT DOCUMENTS

| | | |
|---|---|---|
| CN | 103150837 | 6/2013 |
| WO | WO-2011/004401 | 1/2011 |

OTHER PUBLICATIONS

Preetam, N. et al. (Oct. 2014). "Cardless Cash Access Using Biometric ATM Security System," *International Journal of Enhanced Research in Science Technology & Engineering*, 3(11):13-17.
(Continued)

*Primary Examiner* — Bennett M Sigmond
*Assistant Examiner* — Michael D Cranford
(74) *Attorney, Agent, or Firm* — Finnegan, Henderson, Farabow, Garrett & Dunner, LLP

(57) ABSTRACT

Method and System for performing secure card less transactions using a user device is disclosed. Initially, an authenticated banking application is downloaded on the user device wherein the downloaded application is linked to a user by a unique ID. To perform a transaction, the user logs in to the downloaded application and after login the user device and the ATM are securely paired, wherein the ATM also has a location based unique ID. The secure pairing process uses parameters such as a specific application identifier and a transaction terminal identifier. Once the user initiates the secure pairing process, the ATM displays a unique number generated by the bank server. The unique number is linked to the user and is entered in the portable device. Further, biometric authentication is performed and after validating a token ID is generated where a User specific UI is obtained and rendered onto the user device.

15 Claims, 18 Drawing Sheets

(51) Int. Cl.
*G06Q 20/10* (2012.01)
*G07F 19/00* (2006.01)

(52) U.S. Cl.
CPC ..... *G06Q 20/3223* (2013.01); *G06Q 20/3278* (2013.01); *G07F 19/20* (2013.01)

(58) Field of Classification Search
USPC .......................................................... 705/43
See application file for complete search history.

(56) References Cited

U.S. PATENT DOCUMENTS

| | | | |
|---|---|---|---|
| 2011/0238573 A1 | 9/2011 | Varadarajan | |
| 2012/0284195 A1* | 11/2012 | McMillen | G06Q 20/4014 705/71 |
| 2014/0143137 A1* | 5/2014 | Carlson | G06Q 20/18 705/39 |
| 2015/0046990 A1* | 2/2015 | Oberheide | G06F 21/45 726/6 |
| 2017/0041296 A1* | 2/2017 | Ford | H04L 63/0421 |

OTHER PUBLICATIONS

Istrate, C-M. (Nov. 2014). "Cardless Withdrawl System for Mobile Banking Applications," *Journal of Mobile, Embedded and Distributed Systems*, VI(I): 11-16.

* cited by examiner

METHOD AND SYSTEM FOR PERFORMING SECURE BANKING TRANSACTIONS

PRIORITY CLAIM

This U.S. patent application claims priority under 35 U.S.C. § 119 from Indian Patent Application No. 2295/MUM/2015, filed on Jun. 15, 2015, the entirety of which is hereby incorporated by reference.

TECHNICAL FIELD

The embodiments herein generally relate to banking transactions, and more particularly, to facilitating banking transactions at a transaction terminal such as an Automated Teller Machine (ATM) in a secure and authenticated manner.

BACKGROUND

The increase in financial security and the ease of conducting transactions makes several consumers to adopt the route of cashless buying. Credit cards, debit cards, and traveler checks are now more preferred than the traditional way of buying and selling with cash. Although, paying with cards has several advantages, it also becomes a little cumbersome for a user to carry several cards and remember the Personal Identification Number (PIN) for each of them.

These days, the pervasive usage of credit/debit cards has increased considerably, which in turn leads to fraudulent transactions occurring in a variety of ways. In case of debit card transactions, the debit card holder has to physically carry his card and input his PIN for every single transaction. Sometimes, card-holders handover the card for payment of the bill at restaurants, petrol bunks and so on. During this time, when the customer is out of sight and before the customer receives a counterfoil, the out of sight time can be used for hacking or duplicating the card.

Another widely used mode for conducting transactions are Automated Teller Machines (ATMs). ATM transactions have been in vogue from the past decade across the world and currently, they are an indispensable part of life, at least in most developing and developed countries. The use of ATMs have gone up significantly over the last ten years, not only in terms of their adoption, but also by the variety of banking functionalities that are being offered to a user through the ATM. In the current scenario, a user hardly needs to go to the branch of a bank to carry out many simple transactions such as a cash withdrawal, a balance enquiry, ordering a check book, funds transfer and so on. The current ATM technology utilizes a customized card with an embedded microchip on which the user's information is stored. The user swipes his card in the ATM machine and is asked to enter a unique PIN number to authenticate himself as a valid account holder with the bank. The in-built application in the ATM authenticates the user over the bank's network and allows the user to perform a pre-defined set of transactions.

Despite the security and authentication protocols available in ATM's and also considering the fact that certain security mechanisms are embedded in the cards, the user continues to encounter regular episodes of fraud as well as breach of electronic and physical security at the ATM leading to financial insecurity and sometimes even physical threat to the user of the ATM. The PIN can be accessed without the user's knowledge and a transaction can be executed. The PIN can be traced in different ways, such as by tracking the user's keystrokes. Most of the ATM transactions are card and PIN dependent and require only one level of verification. Once the card is lost or broken, the transactions on ATM cannot be performed. If the PIN is forgotten, the user has to request the bank to regenerate the new PIN, until then the user cannot use the ATM to perform any financial transactions.

In lieu of all the above issues, several lenders have started the facility of card-less transactions enabling customers to transfer cash from their bank accounts to any individual with a mobile number. Hand-held devices such as smartphones are omnipresent today and along with the advent of high-speed transaction networks and real-time data management, the hand held devices are capable of providing a better user experience and allow for increased ease of handling transactions. The card-less transactions can be initiated by bank customers through mobiles or internet banking. Certain banks allow this facility through card-less cash withdrawal-enabled ATMs. To initiate a card-less withdrawal transaction, the sender needs to input name of cash recipient, and provide the contact details of withdrawal beneficiaries. Once the sender's request to register the recipient is accepted, the fund transfer can be initiated. The sender is provided with a code on his/her mobile phone, which has to be passed on to the recipient. The bank sends a text message with another code to the recipient's mobile. Finally, the recipient has to visit the card-less cash withdrawal-enabled ATMs, where cash can be withdrawn after entering both the codes and the mobile number.

However, existing transaction methods are either rudimentary or do not provide a fool-proof secure transaction mechanism. Further, some of these current transaction methods also delay transactions unnecessarily by re-requesting pairing initiation requests.

SUMMARY

In view of the foregoing, an embodiment herein provides a computer implemented method for conducting a secure banking transaction with a user device. The method comprises facilitating a pairing session between the user device and a transaction terminal based on at least one of a predetermined application identifier associated with the user device and a session identifier, wherein the session identifier is associated with the pairing session. Further, the method comprises processing a pairing passcode based on the pairing session to enable pairing of the user device and the transaction terminal, the pairing passcode is generated based on the predetermined application identifier, the session identifier, and a transaction terminal identifier associated with the transaction terminal.

Further, facilitating receipt of a user input is performed for completion of the pairing session, where the user input comprises the passcode to be displayed at the transaction terminal. Additionally, a user associated with the user device is authenticated based on a biometric sample of the user, wherein the biometric sample is used to issue a plurality of commands to the transaction terminal; and finally, the secure banking transaction is performed between the user device and the transaction terminal.

In one aspect a computer implemented system for conducting a secure banking transaction is disclosed, where the system comprises: a memory storing instructions; a hardware processor coupled to the memory, wherein the hardware processor is configured by the instructions to process a predetermined application identifier specific to a user device, and a transaction terminal identifier specific to a transaction terminal; generate a pairing passcode based on the application identifier and the transaction terminal identifier.

Further, the Bank server obtains a biometric sample from a user to be input on the transaction terminal; validate the biometric sample when the biometric data matches a previously registered biometric sample; and authenticates the user associated with the user device to perform the secure banking transaction.

BRIEF DESCRIPTION OF THE DRAWINGS

The embodiments herein will be better understood from the following detailed description with reference to the drawings, in which.

DETAILED DESCRIPTION

Figure 1:
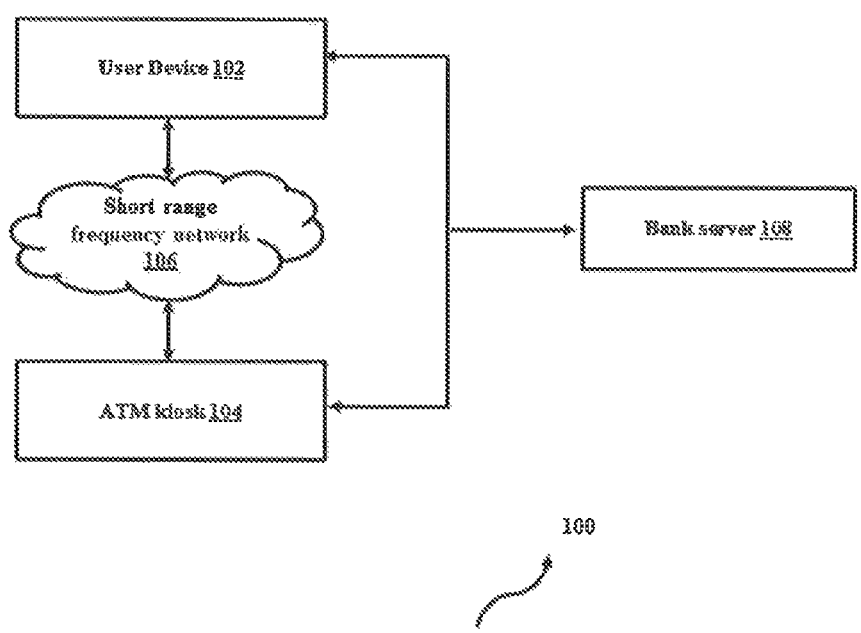
FIG. 1 illustrates a block diagram depicting the architecture of a banking transaction system, according to the embodiments as disclosed herein.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein disclose a method and a system to facilitate banking transactions by remotely pairing a user device with a cash dispenser and a transaction terminal such as an ATM through at least one of a plurality of short range frequency communication channels. Further, in an aspect the embodiments herein process banking transactions by enabling a user to perform the banking transactions on the user device after completion of a secure pairing and a multi-level authentication process. Additionally, the banking transactions are (mainly) performed on the user device thereby enhancing the user's experience.

FIG. 1 illustrates a block diagram depicting the architecture of the banking transaction system, according to the embodiments as disclosed herein. As depicted in FIG. 1, a Banking Transaction System 100 comprises a user device 102, an ATM kiosk 104, and a Bank server 108, wherein the user device 102 and the ATM kiosk 104 are connected via a medium such as the Short range frequency network 106.

The user device 102 used in the embodiments herein can be a communication device primarily configured to interact with the ATM kiosk 104 through the Short Range Frequency Network 106. The ATM kiosk 104 is connected to the Bank server 108 and is communicatively engaged during transactions.

For example, the user device 102 can be a personal computing tablet, a smart phone, a Personal Digital Assistant (PDA), a tablet, and so on.

The user device 102 is a portable device which is configured to be compatible for pairing and interfacing with the ATM kiosk 104. The Banking Transaction System 100 may be implemented in any of a variety of conventional computing devices, including, for example, servers, a desktop PC, a notebook or portable computer, a workstation, a mobile computing device, an entertainment device, and an internet appliance.

In one aspect, the Banking Transaction System 100 is connected to the user device 102 over the Short Range Frequency Network 106 and the Bank Server 108 through one or more communication links. The communication links between the Banking Transaction System 100 and the user device 102 are enabled through a desired form of communication, for example, via dial up modem connections, cable links, digital subscriber lines (DSL), wireless or satellite links, or any other suitable form of communication.

The Short Range Frequency Network 106 and the Bank Server (Network) 108 may be wireless networks, wired networks, or a combination thereof. The Short Range Frequency Network 106 and the Bank Server 108 can also be an individual network or a collection of many such individual networks, interconnected with each other and functioning as a single large network, e.g., the Internet or an intranet. The Short Range Frequency Network 106 and the Bank Server 108 can be implemented as one of the different types of networks, such as intranet, Local Area Network (LAN), Wide Area Network (WAN), the internet, and such. The Short Range Frequency Network 106 and the Bank Server 108 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), and so on, to communicate with each other. Further, the Short Range Frequency Network 106 and the Bank Server 108 may include network devices, such as network switches, hubs, routers, Host Bus Adapters (HBAs), for providing a link between the Card less Transaction System 100 and the user device 102 through the ATM kiosk 104.

In the context of the embodiments herein, the ATM kiosk 104 is referred alternatively as a transaction terminal. Additionally, the ATM Kiosk 104 is preferably adapted to work as a cash dispenser and function as a transaction terminal, and the ATM kiosk 104 is configured to receive messages from the Bank server 108. The ATM kiosk dispenses cash and transaction receipts to the user in response to a trigger from the Bank server 108. The ATM kiosk 104 includes a plurality of biometric devices and modules (not specifically shown in Figure) in order to facilitate biometric authentication. The ATM kiosk 104 offers at least one ATM type interface (not shown in Figure) along with at least one Biometrics capture device such as a finger print scanner, an Iris camera, a Palm/Finger Vein scanner, a face recognition camera and so on. The ATM kiosk 104 is embedded with a large computer Central Processing Unit (CPU) (not shown in Figure) and a Memory (not shown in Figure) that provides sufficient processing capabilities to support high-end biometrics verification or identification systems.

In one embodiment, the ATM kiosk 104 may offer a touchscreen multilingual interface to enable ease of interaction for facilitating transactions in the Banking transaction system 100.

In an embodiment, the ATM kiosk 104 is configured for communication with the user device 102 through a contactless means, which may include but not be limited to communication through any suitable wireless connection such as RFID, Bluetooth™ or NFC.

Figure 2:
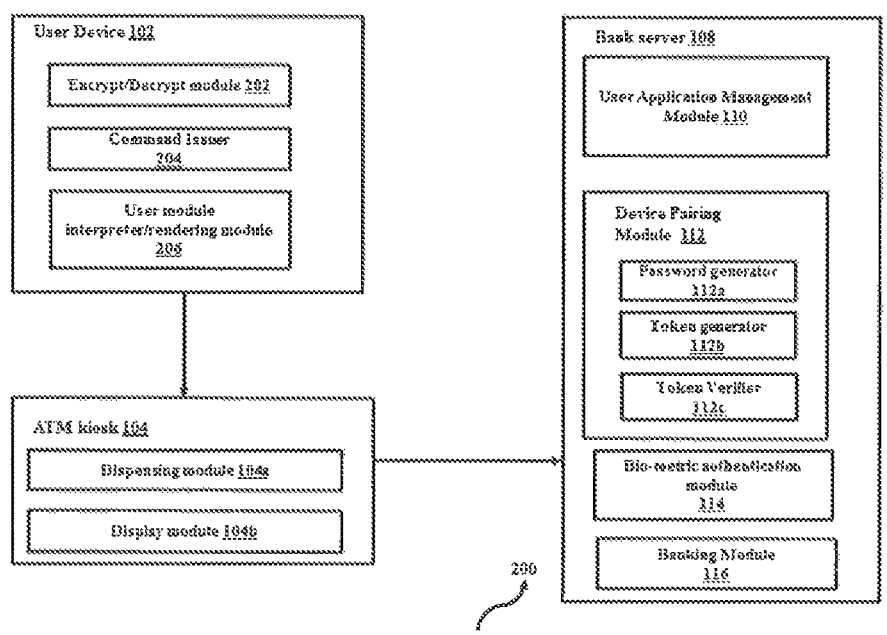
FIG. 2 illustrates a schematic block diagram for the user device 102 for conducting the banking transaction, according to the embodiments as disclosed herein.

FIG. 2 illustrates a schematic block diagram of the user device 102 for conducting the card less transaction, according to the embodiments as disclosed herein. As depicted in FIG. 2, the user device 102 comprises of an Encrypt/Decrypt Module 202, a command issuer 204, and a User module/rendering module 206.

The Encrypt/Decrypt module 202 is configured to ensure that the user requests for transactions are encrypted while inputting the commands on the command issuer 204. The transaction related information input into the user device 102 may be encrypted with a key or other secure credentials stored on the Bank Server 108, such that the transaction information transmitted from the user device 102 to the ATM kiosk 104 and again from the ATM kiosk 104 to the Bank server 108 is further secured and protected from interceptions and attacks. A plurality of transaction related commands may be issued by the command issuer 204. The User module/rendering module 206 is configured to display certain interfaces based on a predetermined application identifier such as an app ID and a token generated by a User Application Management Module 110.

Further, the user device 102 is configured to communicate with the ATM kiosk 104 through the Short range frequency network 106. The ATM kiosk 104 connects to the Bank server 108 via a Firewall (not shown in Figure) and a Gateway (not shown in Figure). The ATM kiosk 104 comprises a dispensing module 104 *a* and a display module 104 *b* wherein the dispensing module 104*a* is configured to dispense cash and other transaction related information receipts while the display module 104 *b* is configured to display certain information such as a pairing passcode and so on after communication with the bank server 108.

In one embodiment, the dispensing module 104*a* dispenses cash and other transaction related information receipts, when the Bank server 108 issues a token upon validating whether the user device 102 is in the midst of a valid card less transaction session with the ATM kiosk 104. The token issued comprises information such as the transaction related details and so on.

Referring to FIG. 2, the Bank server 108 comprises the user application management module 110, the Device pairing module 112, the Bio-metric authentication module 114, and the Banking Module 116.

The User Application Module 208 enables a downloaded financial transaction application on the user device 102 to be registered with an application identifier. The Application Identifier generated includes different module parameters such as device information and other user details. The Password generator 112*a* generates one or more passwords during the pairing process where the generated one or more passwords is entered on the user device 102 in order to complete the secured pairing process. The Token Generator 112*b* generates one or more tokens for pairing authentication and biometric authentication. The token generated includes a plurality of parameters such as a transaction terminal identifier, a User Device ID, a Session Identifier, a Biometric authentication ID and an encryption key. The Token Verifier 112*c* validates a session such as a time out of a session, the authenticity of the user device 102, and other related parameters.

In the ATM kiosk 104, a biometric identifier (not shown in Figure) includes a reader module (not shown in figure)). The reader module is configured to authenticate one or more biometric samples received by the ATM kiosk 104. (for example, in case the biometric sample provided at the ATM kiosk 104 is a palm print of the user, the reader module is configured to match the palm print provided by the user at the ATM kiosk 104 with the palm print stored in a database of the Bank server 108). If the biometric sample of the user is verified then the token is generated or else the token even if generated is invalidated. The User application management module 110 issues certain user interface templates after the biometric authentication process is successful.

The Device Pairing Module 112 is configured to enable secured pairing between the user device 102 and the ATM kiosk 104 to identify and authenticate a transaction, for example by generating a password or a passcode. The generated password or passcode is entered on the user device 102 to complete the pairing process. The Pairing process is facilitated through at least one of a plurality of short range wireless communication protocols on the Short Range Frequency Network 106 such as NFC, Bluetooth™, and RFID and so on.

The Bio-metric authentication module 114 is configured to provide two or more levels of authentication upon facilitation of secure pairing between the user device 102 and the ATM kiosk 104. For example, the Bio-metric authentication module 114 may employ a multispectral imaging method which uses multiple spectrums of light and advanced polarization techniques to extract unique fingerprint characteristics from the surface and the subsurface of the skin of the user. For example, the user may interface with the ATM kiosk 104 to provide electronic or biometric information, where the biometric information may include a retinal scan or a fingerprint into a device camera, or the user device 102 may interface with the ATM kiosk 104 by generating a code, PIN, a one-time passcode (OTP), a digital signature, a key, a secret, a datum, a signal, a machine identifier or other dynamic value using a dynamic value generator or an OTP generator and then inputting the generated value.

The User Application Management Module 110 is configured to determine one or more user interfaces to be displayed on the user device 102.

The Banking module 116 enables a user specific interface user on the User Application Management Module 110 which is then rendered on to the user device 102. For example, (templates such as reminding the user of a monthly offer, reward amount credited in the account are displayed on the user device 102)

Figure 3:
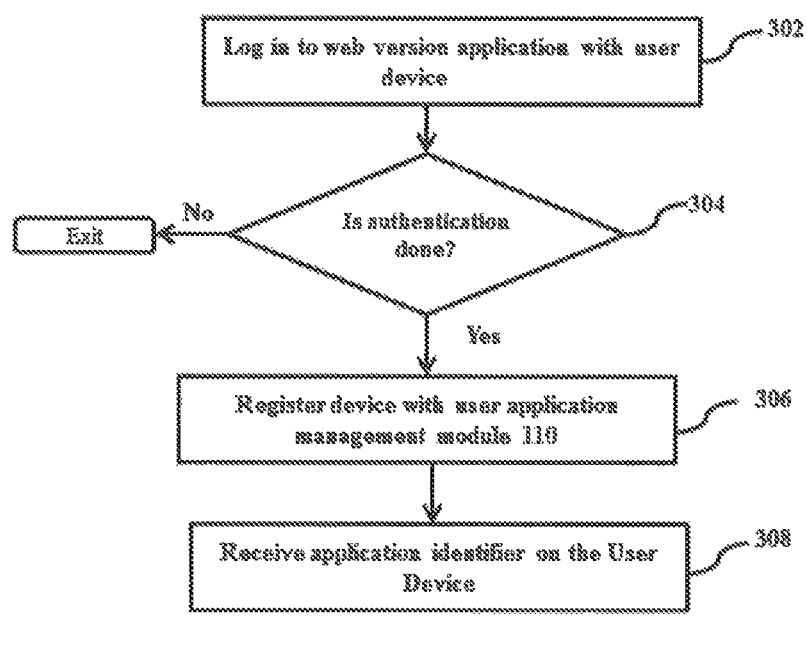
FIG. 3 with reference to FIG. 1 illustrates a flow diagram for method 300 depicting the registration process in the banking transaction, according to the embodiments as disclosed herein.

FIG. 3 with reference to FIG. 1 illustrates a flow diagram for method 300 depicting the registration process in the banking transaction method, according to the embodiments as disclosed herein.

In an embodiment, the method for performing banking transactions is implemented on the user device 102. The financial transaction application is installed/downloaded on the user device 102. The downloaded financial transaction application includes a unique ID linked to the user device 102 which is required for establishing connection with the ATM kiosk 104.

The ATM kiosk 104 which functions as a transaction terminal also comprises a location based unique ID which is referred to as a transaction terminal identifier and in order to perform a banking transaction, appropriate login credentials of the user are required to be input on the user device 102.

Upon a successful login, the user device 102 and the ATM kiosk 104 are securely paired. In an embodiment, the secure pairing between the user device 102 and the ATM kiosk 104 can be facilitated by use of short range frequency communication protocols including but not limited to Bluetooth™, Infrared, Radio Frequency Identification (RFID) and NFC.

In an embodiment, the secure pairing mechanism makes use of certain pairing session parameters such as the (user specific) application identifier and the transaction terminal identifier. When the pairing session is initiated, the ATM kiosk 104 displays a unique number generated by the Bank Server 108. In another embodiment, the unique number may be a random number. The unique number is linked to a bank account of the user, wherein the user may enter the unique number on the user device 102 during the pairing session.

Upon confirmation of the secure pairing, the biometric sample of the user is further verified using a plurality of biometric identifiers including but not limited to a fingerprint, a voice recognition password, an eye (iris or cornea) scan, or any other form of bio-metric authentication. Once the biometric authentication process is completed, the biometric sample entered is matched against the previously stored biometric samples of the user. The previously stored biometrics samples of the user may be stored in the Bank server 108 at the time the user registered to be a card-less banking transaction customer. Samples of the user's finger print, iris scan, and other such details are captured and stored securely in the Bank server 108.

Upon validating the biometric sample with the previously stored samples, a token ID is generated and a user specific interface is generated based on a unique token ID and then the user specific interface is rendered onto the user device 102. The user specific interface is presented based on a banking profile of the User. For example, if the user is a high profile/special customer then a customized interface highlighting the common transactions performed by the user is displayed along with a brief summary of the present balance, overview of two or three previous transactions and any particular offers for the month or quarter. If the User is a regular customer, then a standard interface commonly displayed on the ATM kiosk 104 is presented. The User application management module 110 determines the type of user interface to be displayed on the user device 102 and thereby enables the registration process.

Finally, inputs provided on the user device 102 are sent to the Banking module 116 through the ATM kiosk 104 to carry out the required transactions. As indicated previously, the ATM kiosk 104 is customized to facilitate/enable the banking transaction using the user device 102 via the Bank server 108. The Bank server 108 in the context of the embodiments disclosed herein includes a biometric authentication module 114 to provide a second layer of authentication after initial confirmation of successful pairing.

In an embodiment, the transactions performed on the user device 102 are enabled by providing user inputs while the Device pairing module 112 enables pairing with the user device 102. In an example, the pairing process is configured in such a way that only one user can access the ATM kiosk 104 for a particular transaction(s) for a predefined duration of time. In case, the user exceeds the predefined duration of time, the connection may be considered to be lost. For example, a range of 120 seconds to 150 seconds may be provided as a buffer time to allow the user to input the commands on the user device 102 and if the user exceeds the threshold on the buffer time, then the connection is lost. The user has to re-initiate the pairing session in order to process the transaction from the beginning.

As depicted in FIG. 3 with reference to FIG. 1, the registration process involves the user device 102 and the User Application Management module 110. Once the financial transaction application is downloaded from a trusted web version application with appropriate log in details, the financial transaction application is registered with the User Application Management module 110 against the uniquely generated App ID which is subsequently obtained by the user device 102.

At step 302, the user device 102 is logged into the financial transaction application downloaded from the Bank Server 108. A check is performed at Step 304 to verify if certain credentials of the user are authenticated by the Banking Module 116. In case, the authentication process is not performed successfully then the registration process is hard stopped/discontinued/terminated. In case, the authentication process is performed successfully, then the registration process moves to Step 306.

At step 306, the User Device 102 is registered against the User Application Management module 110. When the User Device 102 is registered against the User application management module 110, details such as the International Mobile station equipment identity (IMEI) number, Media access control (MAC) address, Model/Make of the User Device 102, Operating system of the User Device 102 and other essential details are extracted from the user device 102 by the Bank Server 108. By knowing the details of the user device 102, the Bank server 108 is able to issue specific interfaces to the user device 102. For example, if the user device 102 is a basic Global System for Mobile Communications (GSM) mobile phone then a specific interface is displayed and if the user device 102 is a high end smartphone then another specific interface is displayed.

Once the User Device 102 is registered with the User application management module 110 against the App ID, a web version of the financial transaction application receives the App ID on the user device 102. It will be noted herein that various actions/steps in method 300 may be performed in the order presented, in a different order or simultaneously. Further, in some embodiments, some actions listed in FIG. 3 may be omitted.

Figure 4A:
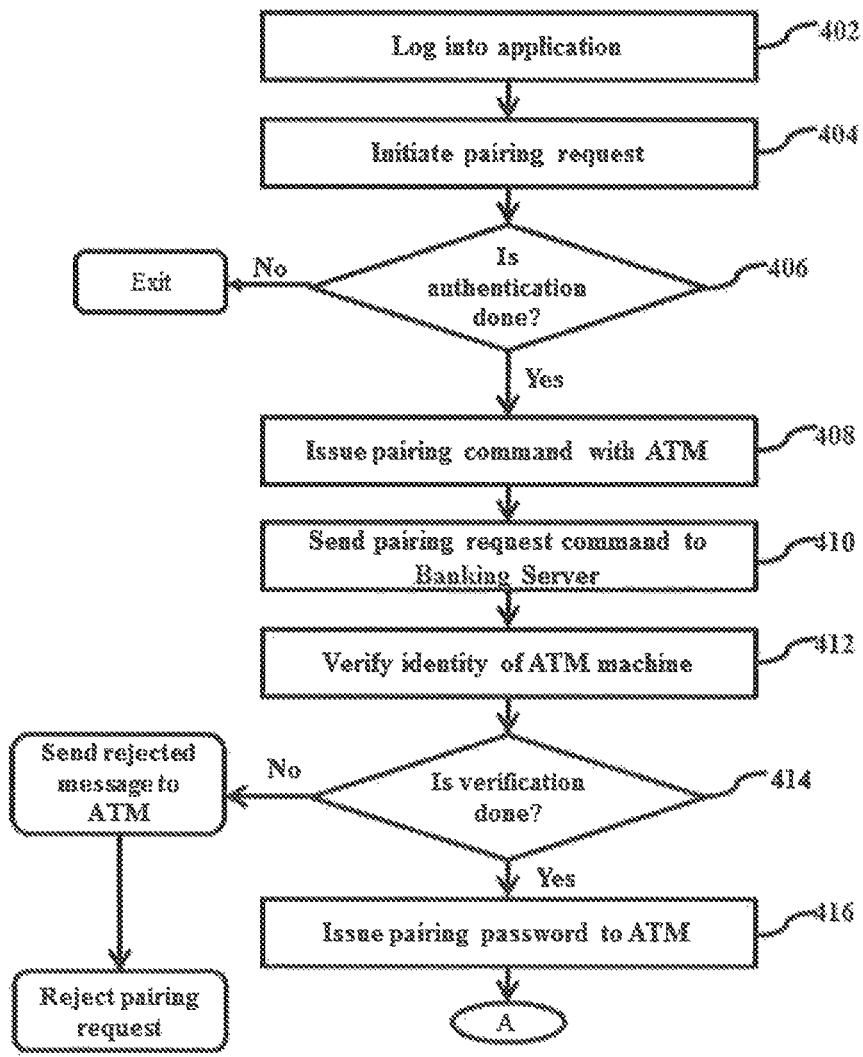
FIGS. 4(a) and 4(b) illustrates a flow diagram depicting the authentication/pairing process in the banking transaction method, according to the embodiments as disclosed herein.
Figure 4B:
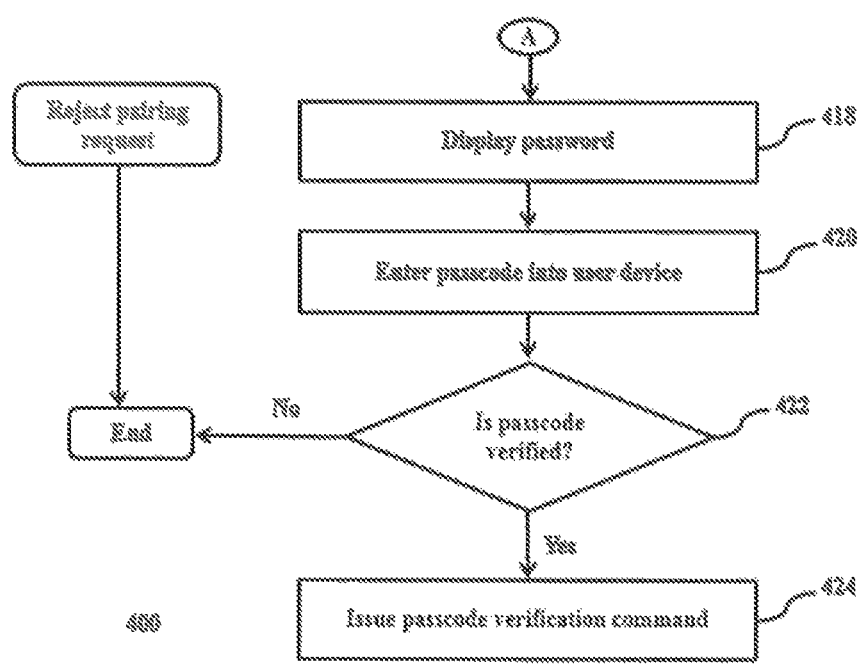

FIG. 4 illustrates a flow diagram depicting the authentication/pairing process in the card-less banking transaction, according to the embodiments as disclosed herein. It will be noted that for the purpose of explaining the authentication/pairing process in the banking transaction method, various references will be made to FIGS. 1 and 2.

At step 402, the user logs into the web version of the financial transaction application either in an offline mode or in an on line mode.

At step 404, when the User enters the vicinity of the ATM kiosk 104, a pairing request is initiated by the on the user device 102. The pairing request can be initiated by switching on the NFC/Bluetooth™ or any other short range protocol enabled at the User Device 102. The Device pairing module 112 in the Bank server 108 confirms or declines the pairing request by displaying a message or a pass code on the ATM kiosk 104.

An authentication check is performed at Step 406 to check the veracity of the communication channel of the Mobile network on which the user device 102 is operating. The authentication process is performed to check if all the pairing protocols are in place and if the security of the pairing process is not compromised. If the authentication process is successful, then the method continues to Step 408. In case, the authentication process is not successful then the process is discontinued or hard stopped. At Step 408, the Device pairing module 112 issues a pairing request command with the ATM kiosk 104.

At Step 410, the pairing request command is sent to the ATM kiosk 104 using a plurality of pairing request parameters such as the (ATM) machine ID and (the) App ID. The pairing request command is sent to the ATM kiosk 104 over a short range frequency communication channel.

Further, at step 412, the Device pairing module 112 verifies the identity of the ATM kiosk 104 and the user device using the machine ID and the App ID. At step 414, a check is performed to ascertain whether verification of the ATM kiosk ID is done. In case verification is successful, then the process continues to Step 416 and in case verification is unsuccessful, a rejected message is sent to the ATM kiosk 104 at step 414. At step 416, a second pairing command is issued to the ATM kiosk 104 along with a session identifier The Session identifier is a particular unique ID generated for a particular transaction session.

At step 418, the ATM kiosk 104 on receiving the pairing command displays a password/passcode on an interface of the ATM kiosk 104, wherein the password/passcode is unique to every transaction and is generated at the Bank server 108. At step 420, the user inputs the passcode/password displayed on the interface of the ATM kiosk 104 in order to complete the pairing process. At step 422, a check is performed to validate the passcode/password input by the User via the ATM kiosk 104. If the password/passcode is successfully verified, then process continues to step 424, else the process is terminated at step 422. At step 424, the ATM kiosk 104 issues a "passcode verified command" to the Device Pairing Module 112. After the process of successful pairing, a next level of authentication is initiated. It will be noted herein that various actions/steps of method 400 may be performed in the order presented, in a different order or simultaneously. Further, in some embodiments, some actions listed in FIG. 4 may be omitted.

Figure 5A:
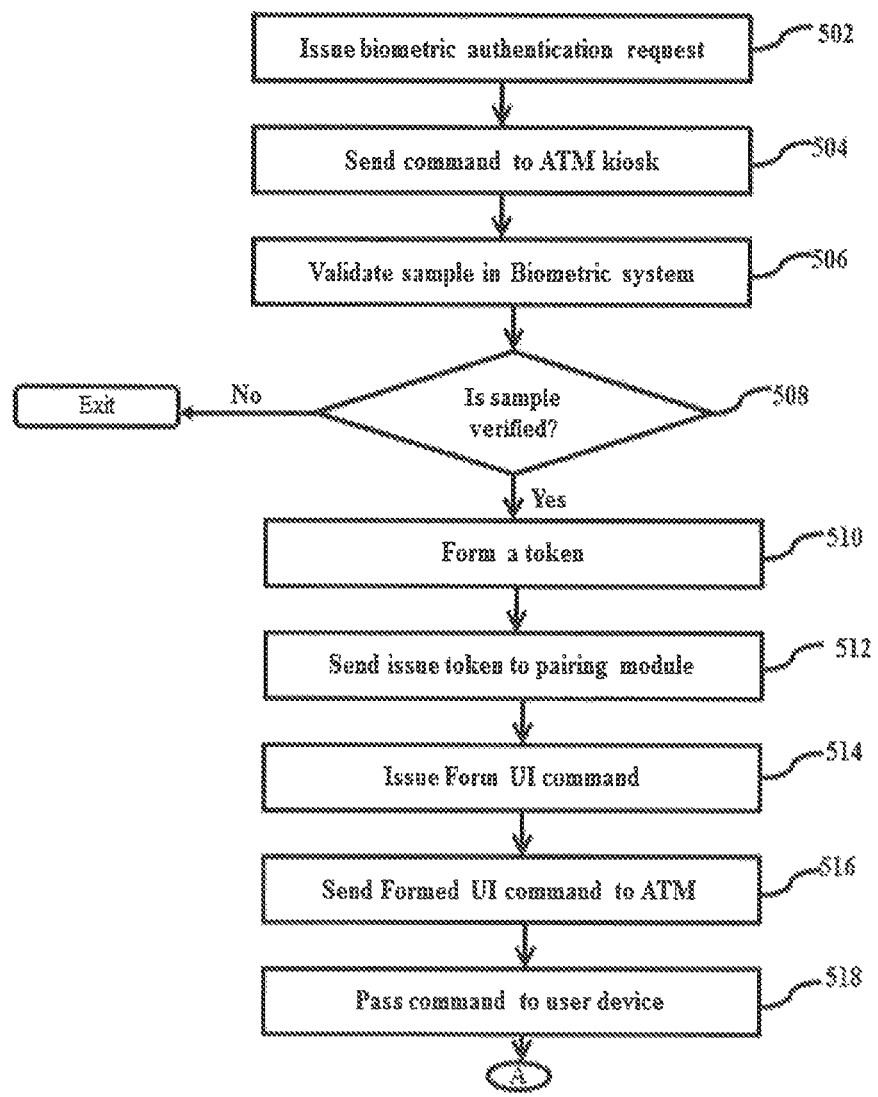
FIGS. 5(a) and 5(b) illustrates a flow diagram depicting the biometric authentication process in the banking transaction method, according to the embodiments as disclosed herein.
Figure 5B:
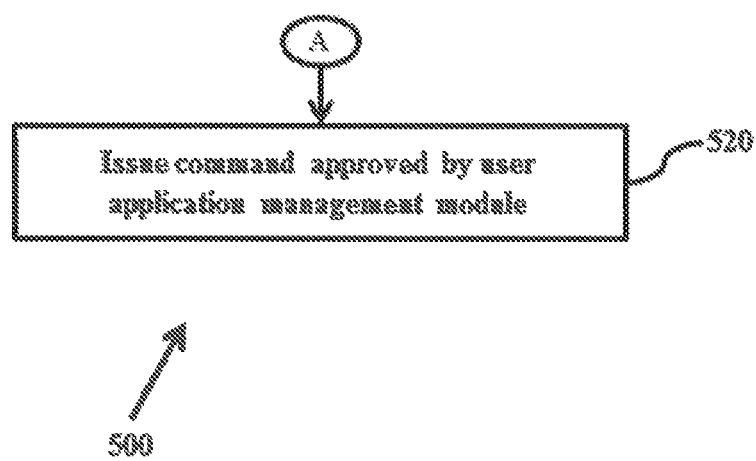

FIG. 5 illustrates a flow diagram depicting the biometric authentication process in the card less banking transaction, according to the embodiments as disclosed herein. It will be noted that for the purpose of explaining the biometric authentication process in the banking transaction method, various references will be made to FIGS. 1 and 2. At step 502, the Biometric Authentication Module 114 issues a biometric authentication request via the Biometric identifier embodied in the ATM kiosk 104. At step 504, the Biometric authentication module 114 sends at least one command to the ATM kiosk 104, depending on the type of ATM kiosk 104. The command sent to the ATM kiosk 104 is dependent upon the application identifier and the User Application Management Module 110. For example, some ATM kiosks 104 may be embedded only with a finger print scanner and therefore no iris scan be performed. Hence, only one type of biometric authentication at one particular point of time can be performed. Once the passcode from the pairing process is verified, every request carries certain parameters such as "App ID" "machine ID" and the Biometric authentication module 114 issues a type of command depending on machine capability of the ATM kiosk 104.

For example, if the ATM kiosk 104 is capable of performing the fingerprint authentication and the user initially enrolled for fingerprint scan at the time of registering as a customer in the bank, then the Biometric authentication module 114 recognizes the credentials of the user and accordingly issues a finger print authentication request.

The ATM kiosk 104 displays a bio-authentication request and once a biometric sample is provided by the user in the ATM kiosk 104, the ATM kiosk 104 sends a plurality of samples to the Biometric authentication module 114 for verification. The parameters that are verified at this point include the machine ID, app ID, and the session ID apart from the biometric sample.

At step 506, the Biometric authentication module 114 validates the biometric samples provided by the user against previously stored samples for the particular transaction session. At step 508, a check is performed to verify the biometric samples provided by the user. In case the sample verification process is unsuccessful, the biometric authentication process ends and in case the sample verification process is successful, the Biometric authentication module 114 proceeds to step 510. At step 510, the device pairing module 112 generates a token by combining parameters such as the application identifier, the transaction terminal identifier, the session identifier, a Biometric verification ID, and an encryption key.

At step 512, the Biometric authentication module 114 sends an issue token to the device pairing module 112. At step 514 the device pairing module 112 issues a specific command such as a form (User Interface) UI command to the User application management module 110 with a valid token. The form UI command is a command that forms a UI depending on the capability of the User device 102 and the banking profile of the user. Further, at step 516, the User application management module 110 sends the formed UI command to the ATM kiosk 104 with a UI template, themes, and a plurality of valid user commands to enable the banking transaction.

At step 518, the Bank server 108 via the ATM kiosk 104 sends the valid user commands to the user Device 102, where the user Device 102 renders the UI based on the output of the User application management module 110. At step 520, the user device 102 issues only a certain set of commands which are approved by the User Application management module 110 and the User Device 102 sends the certain set of commands to the ATM kiosk 104. The approved commands refer to the banking profile of the user and the commands are approved when a token is generated by the token generator 112b.

The ATM kiosk 104 issues the commands to the Banking module 116 to complete the financial transaction. The various actions in method 500 may be performed in the order presented, in a different order or simultaneously. Further, in some embodiments, some actions listed in FIG. 5 may be omitted.

Once the user downloads the application from the verified banking website, appropriate credentials have to be provided for logging into the bank application. After an authentication process, the User Device 102 is registered with the user application management module 110 with respect to the application identifier. At this point, the details of the user device 102 such as device ID (IMEI number), downloaded app version, OS version and the device type are linked to the user's customer ID. The combination of the afore-mentioned appropriate credentials generates the (Unique) App ID.

After logging into the application which is enabled with encryption and decryption through the encrypt/decrypt module 202, the command interface 204, and the user interface 206, the user device 102 initiates the pairing process by sending the pairing request to the device pairing module 112. The device pairing module 112 identifies the ATM kiosk 104 and the details of the user device 102 by using the transaction terminal identifier and the application identifier respectively. The device pairing module 112 generates a onetime password which is displayed on the ATM kiosk 104. At this point the user enters the password on the user device 102. The device pairing module 112 may facilitate pairing of the user device 102 with the ATM kiosk 104 using at least one of a plurality of short range wireless communication protocols such as NFC, Bluetooth™, short range RFID and so on.

After the successful pairing process is complete, the device pairing module 112 initiates a second level of verification (after the initial pairing verification process) which includes biometric authentication. The bio-metrics includes finger print, palm, retina/iris, voice authentication and so on. The biometric authentication module 114 issues a plurality of commands to the ATM kiosk 104 based on the type of transaction terminal identifier received. The ATM kiosk 104 prompts the user to provide a biometric sample and these biometric samples are verified against the registered biometric samples. Once the biometric print is matched, the biometric authentication module 114 commands the device pairing module 112 to issue a token. The token includes a combination of parameters such as an ATM kiosk ID, a user device ID, a session ID, a Biometric authentication ID and an encryption key. These verified biometric prints enable the successful completion of banking transaction.

The device pairing module 112 requests the user application management module 110 for a UI template, corresponding themes and other valid user commands. The ATM kiosk 104 passes on certain commands to the user device 102, wherein the user device 102 is in receipt of the required user interface. A token verifier checks on a plurality of session parameters after the user has provided his input on the user device 102. In case, the session is found to be invalid and if the user goes out of the pairing range then the device pairing module 112 disconnects the user device 102 from the ATM kiosk 104. The restrictions imposed on the pairing range enables the transaction to be terminated or cut off in a secure manner thereby eliminating several possibilities of fraud.

Essentially, a pairing session is facilitated between the user device and a transaction terminal based on the application identifier associated with the user device and a session identifier associated with the pairing session. A pairing passcode is processed based on the pairing session to enable pairing of the user device and the ATM kiosk 104, where the pairing passcode is generated based on the predetermined application identifier, the session identifier, and a transaction terminal identifier associated with the ATM kiosk 104. Further, a user input is required for completion of the pairing session, where the user input at the transaction terminal is a passcode being displayed on the ATM kiosk 104.

In an embodiment, the bank server 108 processes a predetermined application identifier specific to a user device and a transaction terminal identifier specific to a transaction terminal. Further, the bank server 108 generates a pairing passcode based on the application identifier and the transaction terminal identifier, and then obtains a biometric sample from a user to be input on the transaction terminal. Furthermore, a biometric sample is validated when the biometric data matches a previously registered biometric sample and the user associated with the user device is authenticated to perform the secure banking transaction.

In an embodiment, the bank Server 108 is located in a centralized location and is configured to initiate and perform transaction related operations on the command of the user device 102. The Bank server 108 comprises a database (not shown in Figure) which comprises the private keys and the commands issued by the ATM kiosk 104 and the User device 102 which are encrypted with a public key. Additionally, the Bank Server 108 ascertains the token parameters and validity. Therefore, at any point of time, if any of the parameters is changed by any of modules mentioned in FIG. 1 of the card-less banking transaction system 100, a token would not be authorized by the Bank server 108.

Figure 6:
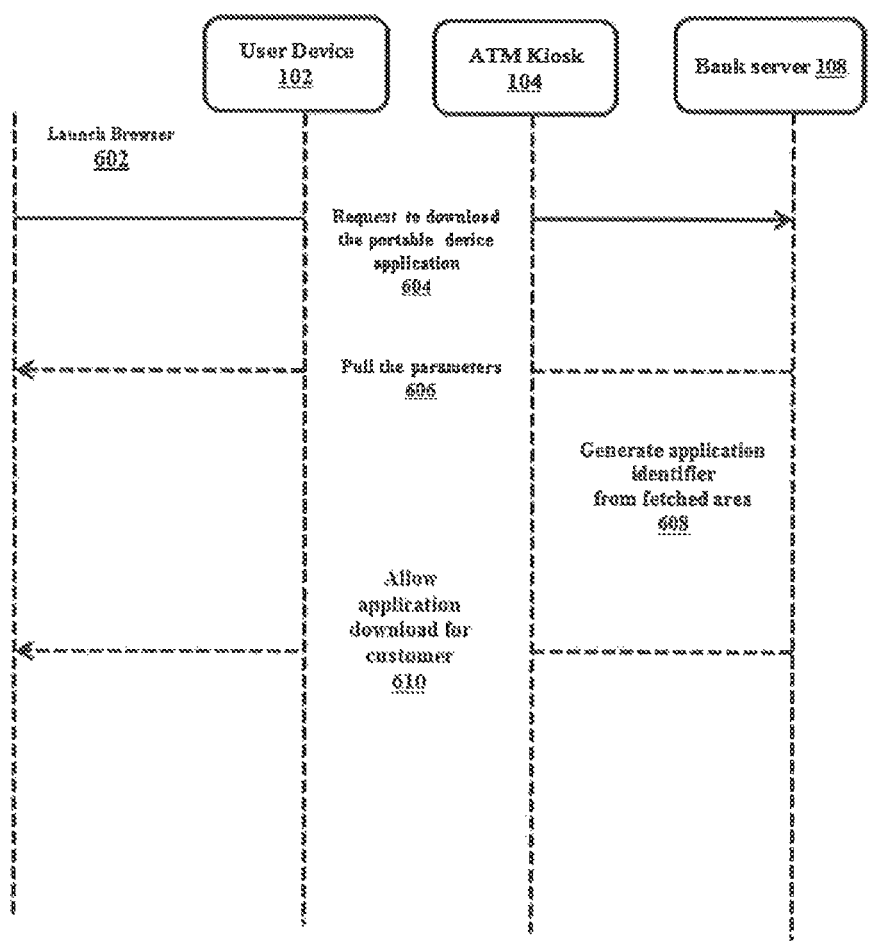
FIG. 6 illustrates a sequence diagram depicting the registration process in the banking transaction method, according to the embodiments as disclosed herein.

FIG. 6 illustrates a sequence diagram depicting the registration process in the card less banking method, according to the embodiments as disclosed herein. As depicted in FIG. 6, the three entities involved in the registration process include, the user device 102, the ATM kiosk 104, and the Bank Server 108. At step 602, the user launches browser of the (trusted) web version of the financial transaction application and at step 604 the user device 102 downloads/installs the financial transaction application.

At step 606, the bank server 108 extracts certain details of the user device 102 such as the IMEI number, device type, OS version, model number, customer ID and so on.

At step 608, the bank server 108 generates the application identifier from the fetched data and makes an entry in the User application management module 110 for a given customer ID and the generated application identifier. Finally, at step 610 the financial transaction application is downloaded by the customer and the application identifier generated by the user application management module 110 is mapped against the downloaded application.

Figure 7:
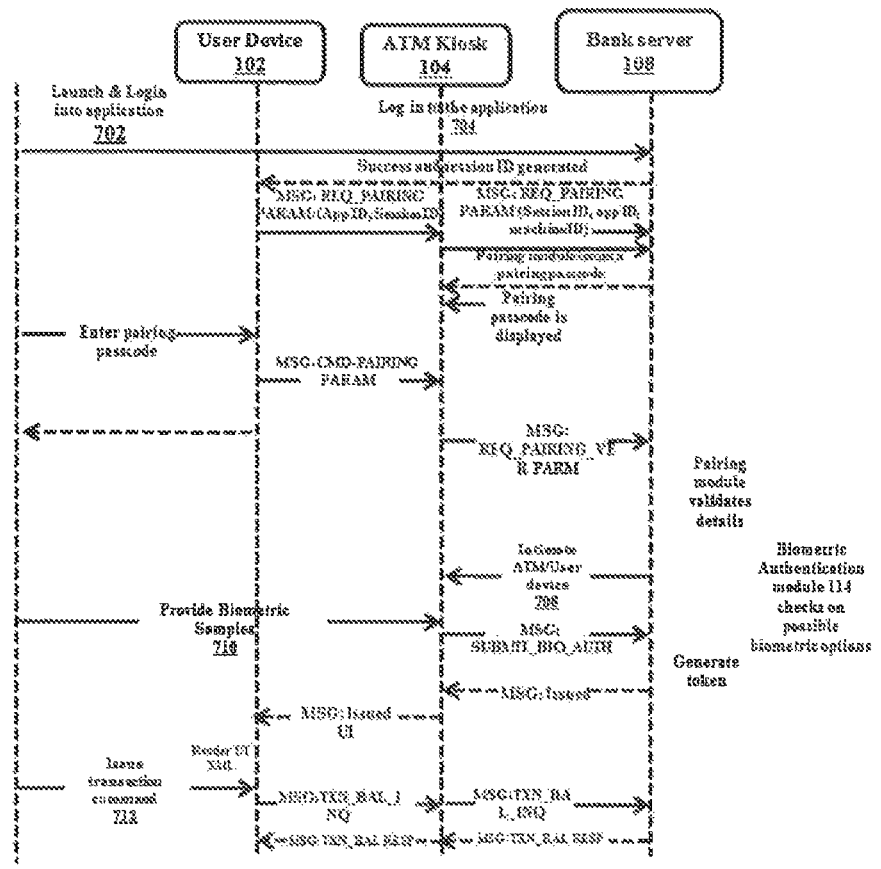
FIG. 7 illustrates a sequence diagram depicting the biometric authentication process in the banking transaction method, according to the embodiments as disclosed herein.

FIG. 7 illustrates a sequence diagram depicting the biometric authentication process in the banking transaction method, according to the embodiments as disclosed herein. At step 702, the user launches and logs into the application on the User Device 102 and step 704, after successful login, a session ID is requested. During the pairing process, the parameters generated between the user device 102 and the Bank server 108 include the App ID and the session ID and the parameters generated between the ATM kiosk 104 and the Bank server 108 include the session ID, app ID, and the machine ID. At this point, the Device pairing module 112 issues a pairing passcode, and the pairing passcode is displayed on the ATM kiosk 104.

Once the user enters the pairing passcode at step 706, the Device pairing module 112 validates a plurality of details and the biometric authentication module 114 checks for possible biometric options and in turn intimates the User Device 102 at step 708. Once biometric samples of the user are provided at step 710, a token is generated at the Bank server 108 end. Finally, the user enters at least one transaction command on the user device 102 and conducts the transaction.

Figure 8A:
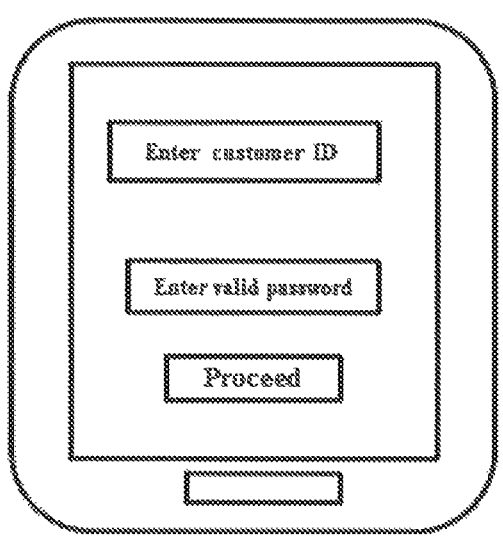
FIGS. 8a to 8h are screenshots depicting various user interfaces that are displayed during the banking transaction method, according to the embodiments as disclosed herein.
Figure 8B:
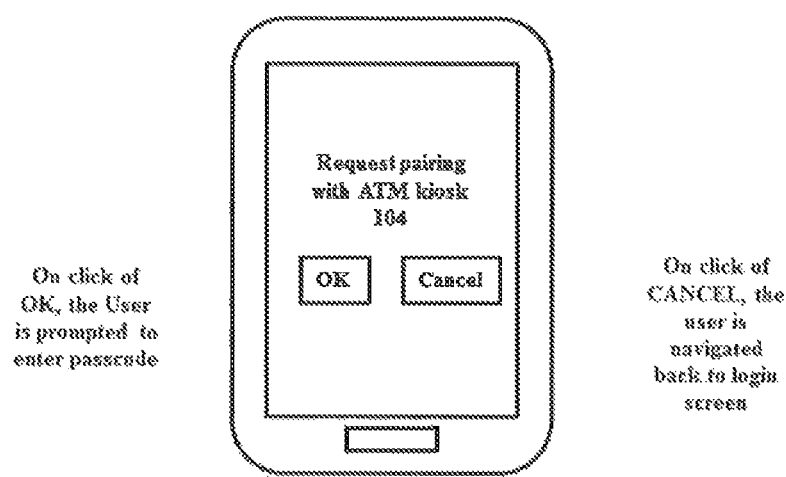

FIGS. 8a to 8h are screenshots depicting various user interfaces that are displayed during the transaction process, according to the embodiments as disclosed herein. FIG. 8a depicts the interface of the command issuer 204 at the time of logging into the application on the user device 102. Initially, the user enters the customer ID, enters the valid password and then proceeds to the next phase. FIG. 8b depicts an interface of the user device 102 at the time of initiation of the pairing process, by requesting to pair with the ATM kiosk 104. By clicking the OK command, the user is prompted to enter a passcode/password and by clicking cancel, the user is navigated back to the previous login screen.

Figure 8C:
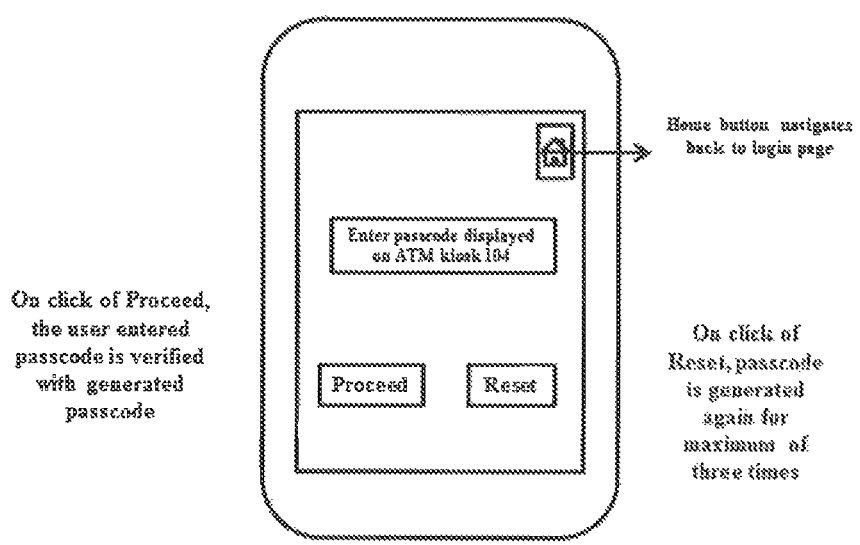
Figure 8D:
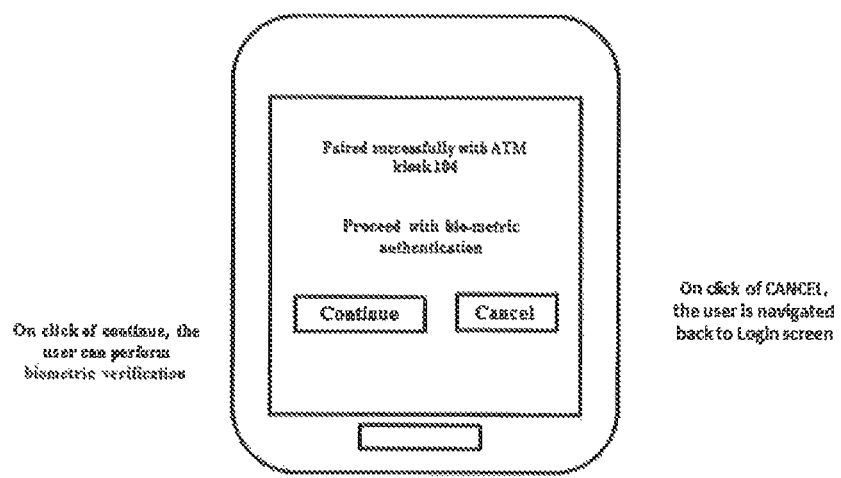

FIG. 8c depicts an interface of the user device 102 during the pairing process when the user needs to enter the passcode displayed on the ATM kiosk 104. By clicking on the proceed tab, the user entered passcode is verified with the generated passcode and by clicking reset, the passcode is generated again for a maximum of three times. FIG. 8d depicts the interface of the user device 102 during the successful completion of the pairing process with the ATM kiosk 104. At this point, the user device 102 prompts the user to proceed with the biometric authentication process. By clicking on the continue tab, the user can perform the biometric authentication process and by clicking cancel tab, the user is navigated back to the login screen.

In an embodiment, the biometric authentication process is performed either on the user device 102 or on the ATM kiosk 104 depending on the capability of the user device 102 or the ATM kiosk 104 since the user application management module 110 obtains the application identifier from a generated token.

Figure 8E:
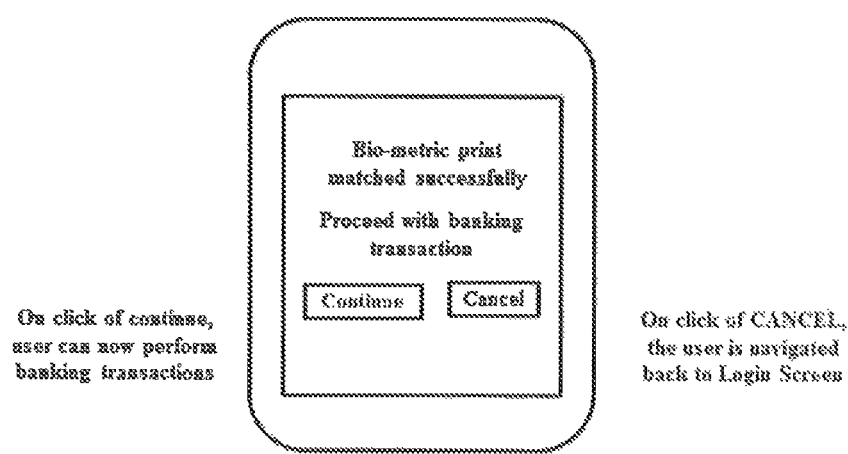
Figure 8F:
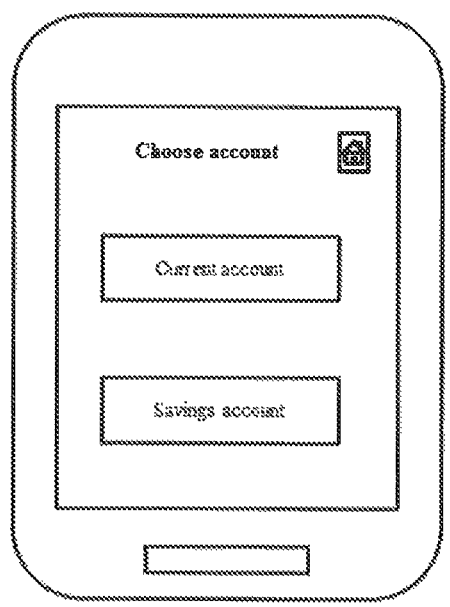
Figure 8G:
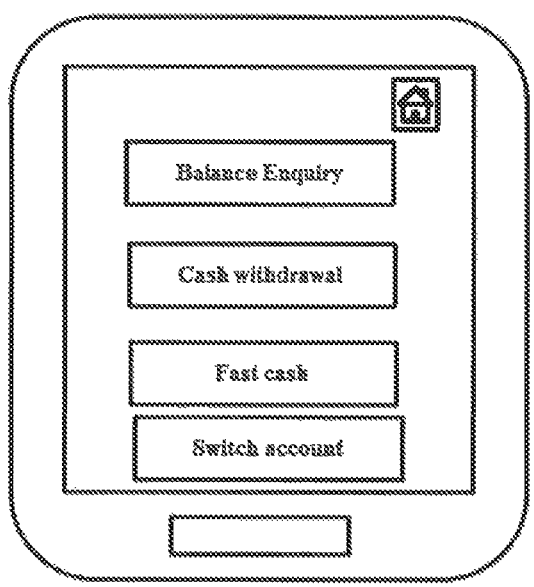
Figure 8H:
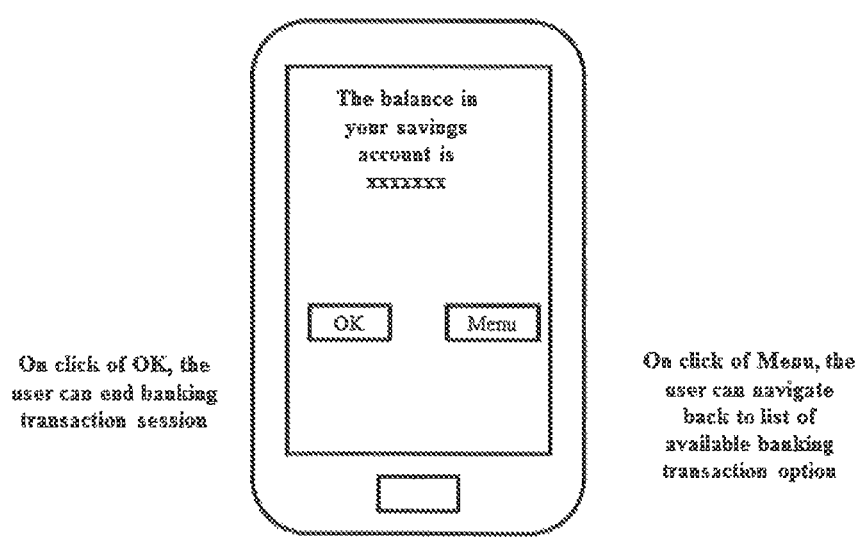

FIG. 8e depicts an interface of the user device 102 during the successful completion of the biometric authentication process, wherein the user device 102 prompts the user to proceed with banking transaction. By clicking continue the user can now perform banking transactions on the user device 102 and by clicking cancel, the user is navigated back to the login screen. FIG. 8f depicts the interface on the user device 102 at the time of conducting the transaction. Depending upon the profile of the customer and the type of user device, a specific interface is displayed. FIG. 8g depicts a typical interface to depict the type of transactions the user can perform. FIG. 8h depicts the interface on the user device 102, when the user has clicked on balance enquiry option. By clicking the OK tab, the user can end the particular banking transaction and by clicking the menu tab, the user can navigate back to the list of available banking transaction options.

The embodiments herein facilitate the user to overcome certain issues in current ATM based transactions. After a secure pairing between the user device 102 and the ATM kiosk 102, the transactions are performed on the user device 102 thereby eliminating the need for the user to carry the card every time and avoid fraud attacks like tracing the PINs. The embodiments herein also provides insight on the use of two level authentication, which uses a random number generated that is unique to the user is displayed on the ATM kiosk 104 and user has to enter in the user device 102 for successful pairing and in order to proceed with biometric verification. This enables, creating of secure entries on the user device 102 and also ensures that user's privacy is not disturbed.

Figure 9:
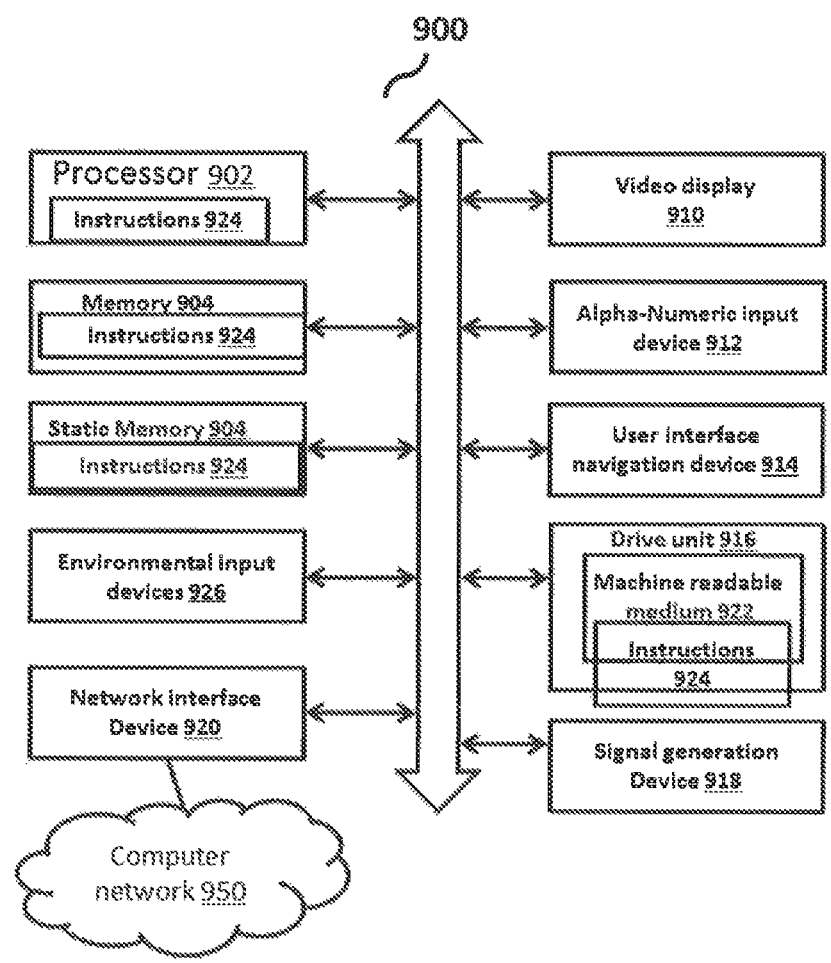
FIG. 9 is a block diagram of a machine in the example form of a computer system 900 within which instructions for causing the machine to perform any one or more of the methodologies discussed herein may be executed, according to the embodiments as disclosed herein.

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920. The computer system 900 may also include an environmental input device 926 that may provide a number of inputs describing the environment in which the computer system 900 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

The instructions 924 may further be transmitted or received over a computer network 950 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A computer implemented method for conducting a secure banking transaction with a user device, the method comprising:

facilitating by a processor a pairing session between the user device and a transaction terminal based on at least one of a predetermined application identifier associated with the user device and a session identifier when a user launches and logs in a transaction application on the user device, wherein the session identifier is a particular unique identifier generated for the pairing session once the predetermined application identifier and a transaction terminal identifier associated with the transaction terminal are verified;

processing by the processor a pairing passcode based on the pairing session to enable pairing of the user device 102 and the transaction terminal, wherein the pairing passcode is a random number generated uniquely for each session and displayed on a transaction terminal interface, the pairing passcode being generated based on the predetermined application identifier, the session identifier, and the transaction terminal identifier associated with the transaction terminal, wherein the predetermined application identifier is generated by installing a financial transaction application on the user device and combining a plurality of registration details;

facilitating by the processor receipt of a user input for completion of the pairing session, the user input comprising the pairing passcode being displayed at the transaction terminal interface to check the inputted pairing passcode;

authenticating by the processor a user associated with the user device based on a biometric sample of the user, wherein the transaction terminal facilitates the biometric authentication by means of biometric modules or devices and wherein the biometric sample is used to issue a plurality of commands to the transaction terminal, wherein the authenticating of the user associated with the user device based on the biometric sample is initiated by:

requesting by the processor biometric verification upon completion of the pairing session, sending by the processor at least one bio-metric system trigger command to the transaction terminal depending upon the transaction terminal identifier, validating by the processor the biometric sample of the user against a previously registered biometric sample of the user, wherein a token is generated only if the biometric sample is validated, else the generated token is invalidated, sending by the processor a request for providing a user interface, and rendering by the processor at least one user specific interface on the user device; and performing by the processor the secure banking transaction between the user device and the transaction terminal, when the authentication of the user using the biometric sample succeeds.

2. The computer implemented method as claimed in claim 1, the method further comprising:

commanding by the processor a pairing module to issue the token based on authentication of the at least one identification detail; and requesting by the processor the application to provide at least one of a User Interface template, a theme, and a valid user command.

3. The computer implemented method as claimed in claim 2, wherein the token comprises at least one of the transaction terminal identifier, a user device ID, the session identifier, a biometric authentication ID, and an encryption key.

4. The computer implemented method as claimed in claim 1, wherein the pairing session is facilitated when the user device is within a predetermined distance from the transaction terminal.

5. The computer implemented method as claimed in claim 1, wherein the method further comprises verifying by the processor the user device with at least one of a device ID, a downloaded app version, an Operating System version and a device type.

6. The computer implemented method as claimed in claim 1, wherein the plurality of registration details comprises a combination of a device ID, a downloaded app version, an Operating System version and a device type associated with the user device.

7. The computer implemented method as claimed in claim 1, wherein the pairing session between the user device and the transaction terminal is facilitated based on at least one of a plurality of short range wireless communication protocols, further wherein the short range wireless communication protocols comprise at least one of a NFC, a Bluetooth™, and a RFID.

8. The computer implemented method as claimed in claim 1, wherein the biometric sample for authenticating the user comprises at least one of a finger print, a palm print, a retina scan, an iris scan, and a voice authentication.

9. A computer implemented system for conducting a secure banking transaction, the system comprising:

a memory storing instructions; a hardware processor coupled to the memory, wherein the hardware processor is configured by the instructions to:

verify a predetermined application identifier specific to a user device, and a transaction terminal identifier specific to a transaction terminal to create a pairing session between the user device and the transaction terminal, when a user launches and logs in a transaction application on the user device and to generate a session identifier, wherein the session identifier is a particular unique identifier generated for the pairing session, wherein the predetermined application identifier is generated by installing a financial transaction application on the user device and combining a plurality of registration details;

generate a pairing passcode based on the application identifier, the session identifier associated with the pairing session, and the transaction terminal identifier, wherein the pairing passcode is a random number generated uniquely for each session and displayed on a transaction terminal interface;

receive a user input from the user device, the user input comprising the pairing passcode displayed on the transaction terminal interface to check the inputted pairing passcode;

validate a biometric sample when the biometric data matches a previously registered biometric sample, wherein the transaction terminal facilitates the biometric validation by means of biometric modules or devices, authenticate the user associated with the user device based on the biometric sample is initiated by:

requesting by the processor biometric verification upon completion of the pairing session, sending by the processor at least one bio-metric system trigger command to the transaction terminal depending upon the transaction terminal identifier, validating by the processor the biometric sample of the user against a previously registered biometric sample of the user, wherein a token is generated only if the biometric sample is validated, else the generated token is invalidated, sending by the processor a request for providing a user interface, and rendering by the processor at least one user specific interface on the user device; and authenticate the user associated with the user device to perform the secure banking transaction, when the authentication of the user using the biometric sample succeeds.

10. The computer implemented system as claimed in claim 9, wherein the transaction terminal includes a dispensing module and a display module, further wherein the dispensing module dispenses cash and a plurality of transaction related information receipts, when the token is issued upon validating whether the user device is in the midst of a valid secure banking transaction session with the transaction terminal.

11. The computer implemented system as claimed in claim 9, wherein the system further comprises:

a device pairing module configured to enable pairing with the user device during the pairing session, wherein the pairing is facilitated by a plurality of short range wireless communication protocols and the short range wireless communication protocols comprise at least one of a Near Field Communication, a Bluetooth, and a Radio Frequency Identification; and a user application management module configured to determine a user specific interface to be displayed on the user device.

12. The computer implemented system as claimed in claim 11, wherein the device pairing module is further configured to identify the transaction terminal and details of the user device by using at least one of the transaction terminal identifier and the predetermined application identifier.

13. The computer implemented system as claimed in claim 11, wherein the device pairing module is further configured to generate the pairing passcode to be displayed on the transaction terminal.

14. The computer implemented system as claimed in claim 11, wherein the device pairing module comprises of a password generator, a token generator, and a token verifier, further wherein the password generator generates a password during the pairing session.

15. The computer implemented system as claimed in claim 9, wherein the device pairing module is configured to allow access to the user device for a predefined time, and when the predefined time exceeds a threshold, the pairing session is terminated.

* * * * *